United States Patent
Bansal et al.

(10) Patent No.: US 8,801,933 B2
(45) Date of Patent: Aug. 12, 2014

(54) MEMBRANE DISTILLATION MODULES USING OLEOPHOBICALLY AND ANTIMICROBIALLY TREATED MICROPOROUS MEMBRANES

(75) Inventors: Vishal Bansal, Overland Park, KS (US); Christopher Keller, Overland Park, KS (US)

(73) Assignee: BHA Altair, LLC, Franklin, TN (US)

( * ) Notice: Subject to any disclaimer, the term of this patent is extended or adjusted under 35 U.S.C. 154(b) by 363 days.

(21) Appl. No.: 13/233,171

(22) Filed: Sep. 15, 2011

(65) Prior Publication Data
US 2013/0068689 A1    Mar. 21, 2013

(51) Int. Cl.
| | |
|---|---|
| B01D 15/00 | (2006.01) |
| C02F 1/44 | (2006.01) |
| B01D 39/00 | (2006.01) |
| B01D 39/14 | (2006.01) |
| B01D 63/00 | (2006.01) |
| B01D 71/36 | (2006.01) |
| B01D 61/36 | (2006.01) |

(52) U.S. Cl.
CPC .................................. *B01D 61/362* (2013.01)
USPC ... 210/640; 210/490; 210/502.1; 210/500.36; 210/500.35; 210/321.6

(58) Field of Classification Search
CPC ...... B01D 61/362; B01D 69/10; B01D 71/26; B01D 71/32; B01D 2317/08; B01D 2323/46; B01D 2325/48; B01D 2311/2669; B01D 71/36; B01D 2325/20; B01D 2202/00; B01D 71/06; B01D 71/34
USPC .......... 210/640, 490, 500.36, 500.27, 500.42; 521/27; 202/200; 428/306.6, 422, 336, 428/319
See application file for complete search history.

(56) References Cited

U.S. PATENT DOCUMENTS

| | | | |
|---|---|---|---|
| 4,419,187 A | 12/1983 | Cheng et al. | |
| 4,419,242 A | 12/1983 | Cheng | |
| 4,476,024 A | 10/1984 | Cheng | |
| 5,102,550 A * | 4/1992 | Pizzino et al. | 210/640 |
| 5,403,483 A | 4/1995 | Hayashida et al. | |
| 5,539,072 A * | 7/1996 | Wu | 526/304 |
| 6,228,477 B1 * | 5/2001 | Klare et al. | 428/315.5 |

(Continued)

FOREIGN PATENT DOCUMENTS

WO    2008089484 A1    7/2008

OTHER PUBLICATIONS

Drioli, E and Calabro, V. 1986, "Microporous Membranes in Membrane Distillation," Pure & Appl. Chem, vol. 58, No. 12, pp. 1657-1662.

(Continued)

*Primary Examiner* — Ana Fortuna
(74) *Attorney, Agent, or Firm* — Reinhart Boerner Van Deuren P.C.

(57) ABSTRACT

The present invention provides a system for liquid distillation which includes a vapor permeable-liquid impermeable microporous membrane having structures defining a plurality of pores, an oleophobic material that is applied to the structures of the membrane so as to leave the plurality of pores open, a means for supplying non-distilled liquid to the first side of the membrane, and a means for collecting distilled liquid from a second side of the membrane. In a further example, the present invention provides a method for the distillation of liquids.

14 Claims, 2 Drawing Sheets

(56) References Cited

U.S. PATENT DOCUMENTS

| | | | |
|---|---|---|---|
| 6,660,165 B1* | 12/2003 | Hirabayashi et al. | 210/640 |
| 6,676,993 B2* | 1/2004 | Klare | 427/245 |
| 6,854,603 B2* | 2/2005 | Klare | 210/490 |
| 7,445,799 B1* | 11/2008 | Sarangapani et al. | 424/618 |
| 7,771,818 B2 | 8/2010 | Klare et al. | |
| 7,825,046 B2* | 11/2010 | Hatfield et al. | 442/80 |
| 8,002,874 B2* | 8/2011 | Huang et al. | 95/50 |
| 2004/0002554 A1* | 1/2004 | Klare | 521/27 |
| 2006/0076294 A1 | 4/2006 | Sirkar et al. | |
| 2010/0024651 A1* | 2/2010 | Bansal | 96/13 |
| 2011/0031100 A1 | 2/2011 | Qtaishat et al. | |
| 2011/0041693 A1* | 2/2011 | Hatfield et al. | 96/9 |
| 2011/0165406 A1* | 7/2011 | Burger et al. | 428/306.6 |
| 2011/0180383 A1 | 7/2011 | Ma et al. | |
| 2011/0180479 A1* | 7/2011 | Cordatos et al. | 210/640 |
| 2013/0068689 A1* | 3/2013 | Bansal et al. | 210/640 |

OTHER PUBLICATIONS

Hwang, H., He, H., Gray, S., Zhang, J. and Moon, I., 2011, "Direct Contact Membrane Distillation (DCMD): Experimental Study on the Commercial PTFE Membrane and Modeling," Journal of Membrane Science, No. 371, pp. 90-98.

Search Report from corresponding GB Application No. GB1215817.6 dated Dec. 3, 2012.

* cited by examiner

US 8,801,933 B2

MEMBRANE DISTILLATION MODULES USING OLEOPHOBICALLY AND ANTIMICROBIALLY TREATED MICROPOROUS MEMBRANES

BACKGROUND OF THE INVENTION

1. Field of Invention

The present invention relates to liquid distillation and specifically liquid distillation utilizing membranes.

2. Discussion of Prior Art

Use of vapor permeable-liquid impermeable microporous membranes is known. Such membranes can be used, for example, for liquid distillation. One example of a vapor permeable-liquid impermeable microporous membrane is an ePTFE membrane. An ePTFE membrane is desirable for filtering due to its chemical inertness and inherent hydrophobicity, thus allowing it to resist the flow of liquid therethrough above a certain surface tension. However, it is known that vapor permeable-liquid impermeable microporous membranes become clogged or obstructed easily, leading to low rates of pure liquid flux across the membrane and a decrease in the life of the membrane. Thus there is a need for improvements to avoid such issues.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

In accordance with one aspect, the present invention provides a system for liquid distillation which includes a vapor permeable-liquid impermeable microporous membrane having structures defining a plurality of pores, an oleophobic material that is applied to the structures of the vapor permeable-liquid impermeable microporous membrane so as to leave the plurality of pores open, a means for supplying non-distilled liquid to the first side of the vapor permeable-liquid impermeable microporous membrane, and a means for collecting distilled liquid from a second side of the vapor permeable-liquid impermeable microporous membrane.

In accordance with another aspect, the present invention provides a method for the distillation of liquids including the steps of providing a system that includes a vapor permeable-liquid impermeable microporous membrane, a means for supplying non-distilled liquid to the vapor permeable-liquid impermeable microporous membrane, and a means for collecting distilled liquid from a second side of the vapor permeable-liquid impermeable microporous membrane, applying an oleophobic material to a first side of the vapor permeable-liquid impermeable microporous membrane, supplying the non-distilled liquid to the first side of the vapor permeable-liquid impermeable microporous membrane, maintaining the non-distilled liquid supplied to the first side of the vapor permeable-liquid impermeable microporous membrane at a first temperature while maintaining the distilled liquid collected from the second side of the vapor permeable-liquid impermeable microporous membrane at a second temperature lower than the first temperature, maintaining a great enough temperature difference between the first and second temperatures so as to cause a net flux of the distilled liquid across the vapor permeable-liquid impermeable microporous membrane, and collecting the distilled liquid from the second side of the vapor permeable-liquid impermeable microporous membrane.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
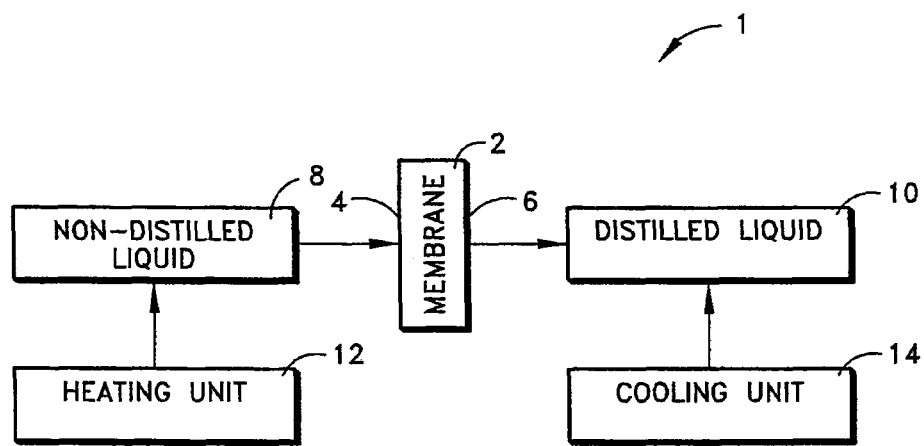
FIG. 1 is a schematized illustration of an example liquid distillation system, in accordance with an aspect of the present invention.

Illustrative embodiments that incorporate one or more aspects of the invention are described and illustrated in the drawings. These illustrated examples are not intended to be overall limitations on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

An example of a liquid distillation system 1 in accordance with aspects of the present invention is schematically shown in FIG. 1. It is to be appreciated that the example is for illustrative purposes only and need not present specific limitations upon the scope of the present invention.

The liquid distillation system 1 is used for a number of industrial applications including the separation of contaminants from a single liquid and the separation of liquids from a combination of two or more liquids. The system 1 will include a vapor permeable-liquid impermeable microporous membrane 2 that filters non-distilled liquid 8 into distilled liquid 10. The membrane 2 has a first side 4 which is to be facing the non-distilled body of liquid 8. Furthermore, the membrane 2 has a second side 6, which is to be facing the distilled body of liquid 10.

The system 1 includes a heating mechanism 12 for the purpose of maintaining the temperature of the non-distilled liquid 8 at a higher temperature than the distilled liquid 10. The heating mechanism preferably utilizes waste heat from an industrial process. The system 1 also includes a cooling mechanism 14 for the purpose of maintaining the temperature of the distilled liquid 10 at a cooler temperature than the non-distilled liquid 8. This is preferably in the form of exposing the filtered liquid to surrounding environmental conditions as standard temperature and pressure (STP).

In general, a vapor permeable-liquid impermeable microporous membrane 2 in liquid distillation separates two bodies of liquid, wherein each body is maintained at a different temperature. This temperature gradient across the membrane 2 creates a vapor pressure differential between the first 4 and second side 6 of the membrane 2, which drives the transport of vapor through the membrane 2 and produces a net pure liquid flux from the warmer side to the cooler side of the membrane 2. The distillation process can be described in three basic steps. First, the non-distilled liquid 8 is maintained at a higher temperature to evaporate it as it reaches the first side 4 of the membrane 2. Second, the vapor phase is transported through the membrane 2. Lastly, condensation occurs when the vapor exits the second side 6 of the membrane 2 and the distilled liquid 10 is maintained at the cooler temperature.

The membrane 2 of FIG. 1 can be made from a number of microporous materials that impart vapor permeability and liquid impermeability performance characteristics including, but not limited to, expanded polytetrafluoroethylene (ePTFE), polyvinylidene fluoride (PVDF), polypropylene and polyethylene. In one example, the membrane 2 is made from ePTFE that has been at least partially sintered.

Figure 2:
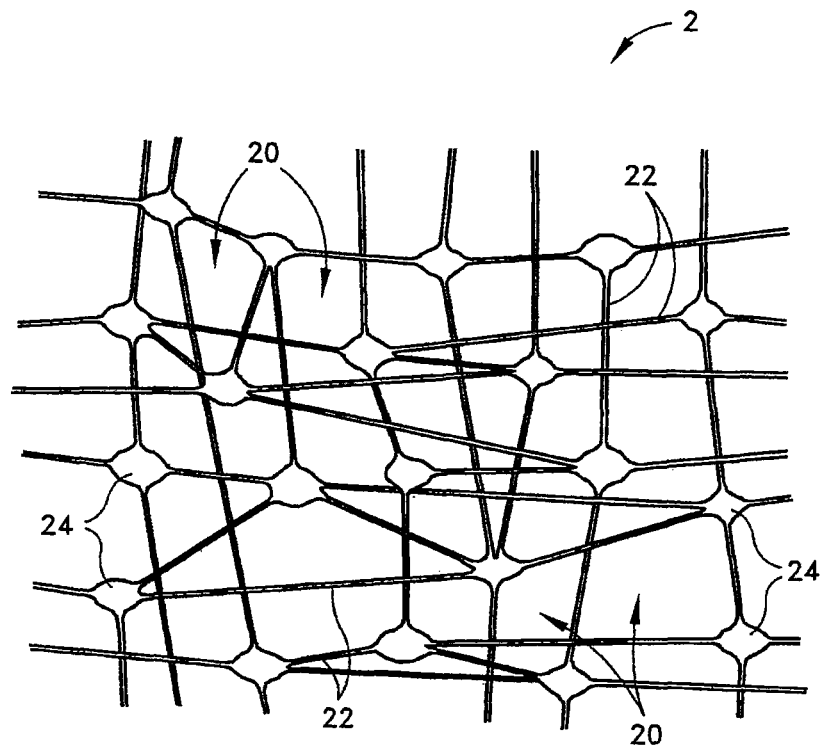
FIG. 2 is an enlarged, schematic view of a portion of a membrane within the system of FIG. 1 and shows open microscopic porosity defined by fibrils connected at nodes.

The structure and porosity of the membrane 2 in FIG. 1 can be seen more clearly in FIG. 2, which illustrates an ePTFE membrane 2. The membrane 2 contains a network of nodes 24 and fibrils 22 that create a plurality of pores 20. The plurality of pores 20 extends completely through the membrane 2 between the first 4 and second sides 6. In another example, additional laminate layers which do not compromise the porosity of the membrane 2 can be adhered to the membrane 2 for further support.

The average size of the pores 20 in the membrane 2 can be in the range of 0.001 micron to 10 microns. In one example, the average pore size is in the range of 0.005 to 5.0 microns. Additionally, the porosity (i.e., the percentage of void volume of the membrane 2) of the membrane 2 can be between about 50% and about 98%. Examples of suitable porosity ranges are from about 70% to about 95%, and from about 80% to about 95%.

In a liquid distillation system 1, the membrane 2 must be able to act as a barrier to liquids, bacteria, solids, and dissolved solids, yet provide the highest possible diffusion rate for vapor. Thus, the pores 20 must be large enough to let vapor through the membrane 2, but small enough to block the flow of liquid droplets and particulates through the membrane 2. Accordingly, if a liquid were to come in direct contact with the membrane 2 and its pores 20, the water would foul, or clog, the pores 20 it came in contact with due to the inability of the liquid to pass through the pores 20. But, theoretically, because the membrane 2 is made from a vapor permeable-liquid impermeable material, the non-distilled liquid 8 is prevented from being retained on the membrane 2 and entering the pores 20, thus keeping the pores 20 open for the transfer of vapor across the membrane 2.

In order to affect the ongoing transfer of vapor across the membrane 2 while blocking transit of liquid, it is desired to use a vapor permeable-liquid impermeable membrane 2 with the highest moisture vapor transmission rate (MVTR). The MVTR is a measure of the passage of water vapor through a material expressed in grams/meter$^2$/day. An example of a suitable MVTR is at least 1,500 grams/m$^2$/day determined by JISL-1099B2 testing. Other examples of suitable MVTRs are at least 25,000 grams/m$^2$/day and at least 50,000 grams/m$^2$/day. Examples of other desirable membrane 2 properties includes a unit weight of from about 0.30 to about 0.60, and from about 0.40 to about 0.50 ounces per square yard; an air permeability of from about 0.5 to about 1.5, and from about 0.75 to about 1.25 CFM; a Mullen Water Entry pressure of from about 5 to about 25, and from about 10 to about 20 PSI, and a liquid impermeability of from about 1 to about 20, and from about 5 to about 15, and from about 8 to about 12 meters of water column (mwc) as determined by ISO 811. In one embodiment, the membrane 2 has a unit weight of 0.42 ounces per square yard, an air permeability of about 1.0 CFM, a Mullen Water Entry pressure of about 15, and a liquid impermeability of about 10 mwc.

However, while the membrane 2 may be made from a vapor permeable-liquid impermeable material, the same material is usually oleophilic, as is the case with ePTFE. Thus, the material making up the membrane 2 is susceptible to contamination by the deposit, collection, and absorption of oil and hydro-carbon base materials on and in the membrane 2. This deposit, collection, and absorption of materials on the membrane is referred to as fouling. When the pores 20 of the membrane 2 become fouled, the membrane 2 is no longer vapor permeable-liquid impermeable at the contaminated regions and the MVTR is lowered. When the MVTR is lowered, the productivity of the system 1 decreases because the amount of vapor that can pass through the membrane 2 is restricted or blocked, which decreases the net flux of distilled liquid across the membrane 2.

Furthermore, once a membrane 2 loses its vapor permeable-liquid impermeable property, it can easily be wet. Wetting is ability of a liquid to maintain contact with a solid surface, which, in this case, is the membrane 2, including the portions of the membrane 2 defining the pores 20. Because the pores 20 allow the passage of vapor but not liquid, once a portion of the membrane 2 is wet, the liquid will be able to maintain contact with the membrane 2 and block the pore(s) 20. However, the liquid will not be able to pass through the pores 20 of the membrane 2.

Over time, as the amount of fouling and wetting increases, the pores 20 become highly restricted and/or blocked, and the loss of productivity of the system 1 makes it necessary to replace the membrane 2 to restore productivity. The prevention or impediment of the amount and rate of fouling will increase the life of the membrane 2 due to the decrease or elimination of restricted and/or blocked pores 20.

Figure 3:
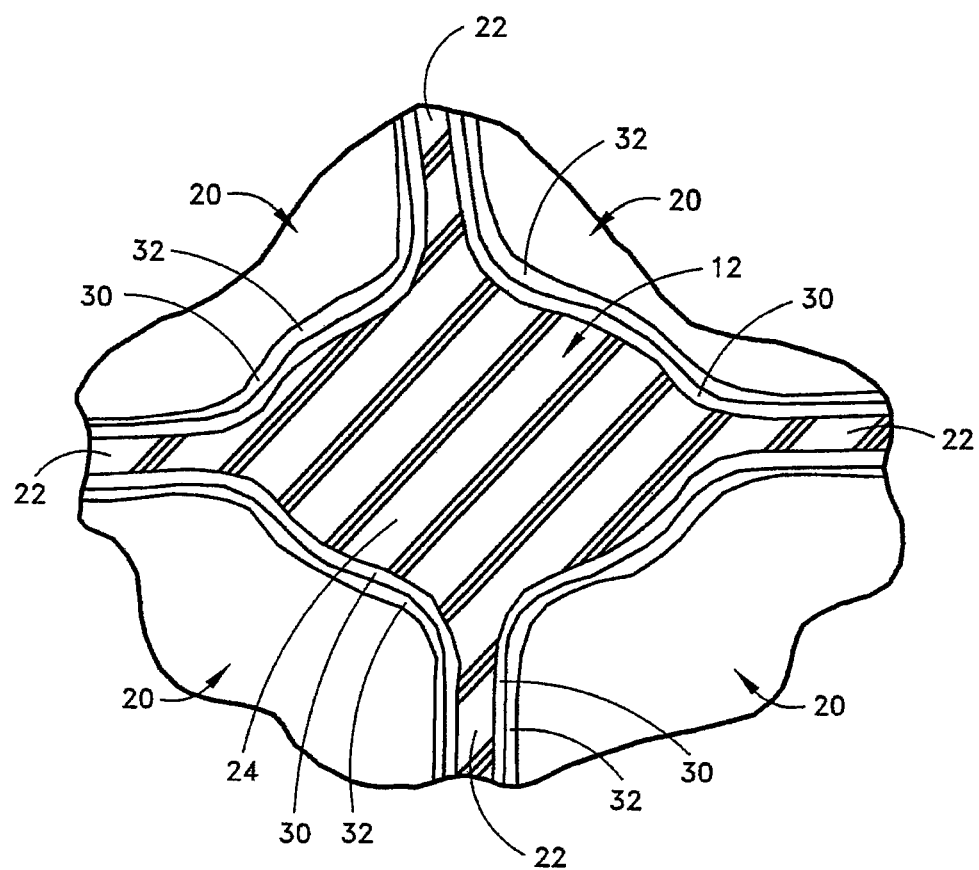
FIG. 3 is a further enlarged view of a portion of FIG. 2 and is sectioned to shown constituent members of the membrane material that include a substrate, with material adhered to the substrate that do not block the pores of the membrane.

To prevent or impede fouling, an oleophobic material 30 is applied to the membrane 2, as shown in FIG. 3. The term "oleophobic" is used to describe a material property that is resistant to contamination from absorbing oils or dissolved organics. An "oleophobic property" or "oleophobicity" of the membrane 2 is typically rated on a scale of 1 to 8 according to AATCC test 118. The higher the oleophobic number rating, the better the oleophobic property, or oleophobicity. The chosen oleophobic material 30 should impart an oil resistance of at least a number 4 determined by AATCC 118 testing. As another example, the oleophobic material 30 can impart an oil resistance of at least a number 7 determined by AATCC 118 testing. The oleophobic material 30 functions to reduce the surface energy of the membrane 2 below the surface tension of the challenge material, which in turn prevents the challenge material from fouling/further fouling the membrane 2 surface. The oleophobic material 30 to be applied may be made from suitable fluorinated polymer materials, including those having a fluoroalkyl portion or a perfluoroalkyl portion. Examples of such materials are perfluoroalkyl acrylic copolymers Fabati 100 and 200, designed and synthesized by Micell Technologies, Inc.

The oleophobic material 30 shown in FIG. 3 is applied to the membrane 2 so that it imparts an oleophobic property to all surfaces of the membrane 2. Application of the oleophobic material 30 is done in such a manner that it covers or completely encapsulates the fibrils 22 and nodes 24, including those portions of the fibrils 22 and nodes 24 forming the walls defining the pores 20, while leaving the plurality of pores 20 open for gas or vapor permeability. This results in a relatively thin and even coating being applied to virtually all of the surfaces of the membrane 2. It is to be appreciated that when applied, some of the oleophobic material 30 may penetrate the membrane material of the fibrils 22 and nodes 24 while some may remain on the surface of the membrane 2. The thickness of the oleophobic material 30 layer applied to the membrane 2 may vary but will not exceed the thickness of the fibrils 22 and nodes 24 themselves.

The pores 20, as noted above, are an opening within a tortuous path defined by a three-dimensional lattice structure of the nodes and fibrils. The effective size of the pore opening will vary depending on the thickness of the oleophobic layer with the size of the pores 20 being inversely proportional to the thickness of the oleophobic material 30 layer. The proper amount of oleophobic material 30 applied is selected to avoid a dramatic reduction of the flow areas in the pores 20 compared to that of a membrane 2 without oleophobic material 30. It is also to be appreciated that the oleophobic material 30 will be applied in such a manner that it may not cover the entire surface of the membrane 2 or walls defining the pores.

Oleophobic material 30 can be introduced into the membrane 2 in a dissolved or partially dissolved state through the use of a carrier. Furthermore, the oleophobic material 30 can be introduced into the membrane 2 in a condition that may be considered fluid to permit motion/movement. More specifically, the oleophobic material 30 can be dissolved by pressurized fluid of carbon dioxide under supercritical conditions which moves the oleophobic material 30 into the microporous membrane 2. The oleophobic coating is then attached/deposited into the microporous membrane 2 by lowering the pressure from supercritical to non-supercritical. It is to be appreciated that the process of applying the oleophobic material 30 may be varied. It is also to be appreciated that the application process may include many different techniques such as utilizing aqueous dispersions or solutions, chemical vapor deposition, plasma, transfer coating process, screen printing process, and gravure roll printing process. These examples are meant to be illustrative and not exhaustive as other techniques are possible and contemplated.

In addition to the possible build-up of oily contaminants on the surface of the membrane 2, contaminants such as bacteria, microbes, and other biological growth can also collect on the surface of the membrane 2 over time, further acting to reduce the MVTR. Thus, to minimize buildup of bacterial and biological growth, an anti-microbial material 32 can also be applied to the membrane 2. This material would act to resist the build-up of bacterial and/or biological growth on the membrane 2. An example of a suitable anti-microbial material 32 is a nanoparticulate form of silver. As with the oleophobic material 30, the anti-microbial material 32 will be applied to the membrane 2 in such a manner that the pores 20 will be left open. Liquid or fluid dispersion techniques can be used to apply the anti-microbial material 32 in combination with the oleophobic material 30. Alternately, the oleophobic materials and the anti-microbial materials may be applied to the membrane in two separate steps.

The oleophobic and anti-microbial material 32 each act on their own to prevent the pores 20 from fouling, which helps to maintain a high MVTR over the life of the membrane 2. In addition, by preventing some level of fouling, each of the materials acts to elongate the life of the membrane 2. It follows that the application of both materials to the membrane 2 would further prevent the level of fouling, leading to the maintenance of an even higher MVTR while also further elongating the life of the membrane 2.

While the membrane 2 is the distillation system 1 component with the most functionality, temperature control and liquid supply and collection mechanisms are also needed. Referring back to FIG. 1, the non-distilled liquid 8 may be supplied to the first side 4 of the membrane 2 by pipes, tubes, pumps, and/or other apparatus(es) (not shown) that can be used to transport liquid from one location to another. A holding tank or container (not shown) may be provided at the end of the piping, tubing or other apparatus so that the non-distilled liquid 8 flows into the holding tank from the piping, tubing or other apparatus prior to reaching the first side 4 of the membrane 2. The non-distilled liquid 8 from the holding tank or container can optionally be pumped from the tank to the first side 4 of the membrane 2.

The same type of system 1 can be used to collect distilled liquid 10 from the second side 6 of the membrane 2. Pipes, tubes, pumps, and/or other apparatus(es) (not shown) that can be used to transport liquid from one location to another can be used to collect and/or transport the distilled liquid 10 away from the second side 6 of the membrane 2. Alternately, the distilled liquid 10 can first flow into a holding tank or container (not shown) before being transported away from the second side 6 of the membrane 2 through the tubing, piping or other apparatus used to transport liquid from one location to another. Optionally, a pump system 1 can transfer the distilled liquid 10 from the interface between the liquid and the second side 6 of the membrane 2 to the holding tank.

As discussed above, in order for liquid to evaporate, pass through the pores 20 of the membrane 2, and condense on the second side 6 of the membrane 2, a temperature gradient must be maintained between the two sides. Referring again to FIG. 1, the non-distilled liquid 8 being supplied to the first side 4 of the membrane 2 must be maintained at a temperature that is higher than the temperature of the distilled liquid 10 being collected at the second side 6 of the membrane 2. This can be done by applying heat to the non-distilled liquid 8 with a means for heating 12 just prior to the liquid reaching the first side 4 of the membrane 2. Any known means of heating and controlling the temperature of a liquid may be used to maintain the temperature at a temperature that is above that of the distilled liquid 10 being collected from the second side 6 of the membrane 2.

The liquid being collected from the second side 6 of the membrane 2 must be maintained at a temperature that is lower than the temperature of the liquid being supplied to the first side 4 of the membrane 2. This can be done by cooling the liquid with a means for cooling 14 at the point where it is first collected from the second side 6 of the membrane 2. If the temperature of the ambient air at the collection point is below that of the temperature of the non-distilled liquid 8 being supplied to the first side 4 of the membrane 2, no additional cooling means may be needed. However, even if the ambient temperature is lower than the temperature of the non-distilled liquid 8, a temperature gradient sufficient to cause a net flux of distilled liquid 10 across the membrane 2 is necessary.

Thus, it is possible that even if the ambient temperature is below that of the non-distilled liquid 8 being supplied to the first side 4 of the membrane 2, it may not create a large enough temperature gradient to produce a net flux across the membrane 2. Accordingly, additional cooling means 14 may be needed to lower and maintain the temperature of the distilled liquid 10 being collected from the second side 6 of the membrane 2 at a temperature that will create a temperature gradient sufficient to cause a net flux of distilled liquid 10 from the membrane 2. Any known means of cooling and controlling the temperature of a liquid may be used to maintain the temperature of the distilled liquid 10 below that of the non-distilled liquid 8 being supplied to the first side 4 of the membrane 2. In some cases, the source of heat energy is the waste heat from existing power plants or industrial boilers.

One embodiment of the distillation system 1 includes the distillation of a single liquid that contains many unwanted contaminants. When a single non-distilled liquid 8 is involved, the distillation system 1 can be used to remove contaminants and deliver the pure form of the liquid. Water is one example of a single non-distilled liquid 8 that can be passed through the liquid distillation system 1. Another embodiment of the distillation system 1 includes the distillation/separation of a combination of liquids. To effect the separation of liquids, the combination of liquids will first be supplied to the first side 4 of the membrane 2. The temperature on the first side 4 of the membrane 2 will be maintained at a temperature above the boiling point of the first liquid but below the boiling point of the second liquid by use of a heating mechanism 12 so that only the first liquid vaporizes. The liquid being collected on the second side 6 of the membrane 2 will be maintained at a temperature that is lower than the temperature being maintained on the first side 4 of the membrane 2 by use of a cooling mechanism 14, while also being low enough to maintain a temperature gradient sufficient to cause the evaporation and subsequent condensation of the first liquid across the membrane 2. Only the first liquid will be collected from the second side of the membrane 6. The second liquid will remain on the first side of the membrane 4, thus effectively separating the two liquids. It is also to be appreciated that a combination of more than two liquids can be separated by the liquid distillation system 1.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed:

1. A system for liquid distillation, the system including:
a vapor permeable-liquid impermeable microporous membrane having structures defining a plurality of pores, the vapor permeable-liquid impermeable microporous membrane comprising an anti-microbial material;
an oleophobic material, the oleophobic material applied to the structures of the microporous membrane so as to leave the plurality of pores open wherein said oleophobic material is a perfluoroalkyl acrylic copolymer;
wherein the vapor permeable-liquid impermeable microporous membrane has a moisture vapor transmission rate (MVTR) of at least 25,000 grams/m$^2$/day determined by JISL-1099B2 testing
means for supplying non-distilled liquid to the first side of the vapor permeable-liquid impermeable microporous membrane; and
means for collecting distilled liquid from a second side of the vapor permeable-liquid impermeable microporous membrane.

2. A system as set forth in claim 1, wherein the antimicrobial material comprises a nanoparticulate form of silver.

3. A system as set forth in claim 1, wherein the oleophobic material has an oil resistance of at least 4 determined by AATCC 118 testing.

4. A system as set forth in claim 1, wherein the vapor permeable-liquid impermeable microporous membrane has a moisture vapor transmission rate (MVTR) of at least 50,000 grams/m$^2$/day.

5. A system as set forth in claim 1, wherein the vapor permeable-liquid impermeable microporous membrane is selected from the group comprising expanded polytetrafluoroethylene, polyvinylidene fluoride, polypropylene and polyethylene.

6. A system as set forth in claim 1, wherein the vapor permeable-liquid impermeable microporous membrane has a liquid impermeability of 10 meters of water column (mwc) determined by ISO 811.

7. A system as set forth in claim 1, wherein a first temperature controlling means maintains the temperature of the non-distilled liquid supplied to the first side of the vapor permeable-liquid impermeable microporous membrane.

8. A system as set forth in claim 1, wherein a second temperature controlling means maintains the temperature of the distilled liquid collected from the second side of the vapor permeable-liquid impermeable microporous membrane.

9. A method for the distillation of liquids including:
providing a system including: a vapor permeable-liquid impermeable microporous membrane, a means for supplying non-distilled liquid to the vapor permeable-liquid impermeable microporous membrane, and a means for collecting distilled liquid from a second side of the vapor permeable-liquid impermeable microporous membrane;
applying an anti-microbial material to the vapor permeable-liquid impermeable microporous membrane;
applying an oleophobic material to the vapor permeable-liquid impermeable microporous membrane wherein said oleophobic material is a perfluoroalkyl acrylic copolymer; and wherein the vapor permeable-liquid impermeable microporous membrane has a moisture vapor transmission rate (MVTR) of at least 25,000 grams/m$^2$/day determined by JISL-1099B2 testing;
supplying the non-distilled liquid to the first side of the vapor permeable-liquid impermeable microporous membrane; and
collecting the distilled liquid from the second side of the vapor permeable-liquid impermeable microporous membrane.

10. A method for the distillation of liquids as set forth in claim 9, wherein the antimicrobial material comprises a nanoparticulate form of silver.

11. A method for the distillation of liquids as set forth in claim 9, wherein the vapor permeable-liquid impermeable microporous membrane has a moisture vapor transmission rate (MVTR) of at least 50,000 grams/m$^2$/day.

12. A method for the distillation of liquids as set forth in claim 9, wherein the vapor permeable-liquid impermeable microporous membrane is selected from the group comprising expanded polytetrafluoroethylene, polyvinylidene fluoride, polypropylene and polyethylene.

13. A method for the distillation of liquids as set forth in claim 9, wherein the vapor permeable-liquid impermeable microporous membrane has a liquid impermeability of 10 meters of water column (mwc) determined by ISO 811.

14. A method for the distillation of liquids as set forth in claim 9, wherein the non-distilled liquid supplied to the first side of the vapor permeable-liquid impermeable microporous membrane is maintained at a first temperature and the distilled liquid collected from the second side of the vapor permeable-liquid impermeable microporous membrane is maintained at a second temperature, wherein the second temperature is lower than the first temperature and the temperature difference between the first and second temperatures is great enough to cause a net flux of the distilled liquid across the vapor permeable-liquid impermeable microporous membrane.

* * * * *

UNITED STATES PATENT AND TRADEMARK OFFICE
CERTIFICATE OF CORRECTION

PATENT NO. : 8,801,933 B2  
APPLICATION NO. : 13/233171  
DATED : August 12, 2014  
INVENTOR(S) : Vishal Bansal Page 1 of 1

It is certified that error appears in the above-identified patent and that said Letters Patent is hereby corrected as shown below:

In the Claims  
Column 7, line 41, claim 1, a -- ; -- should be inserted after -- open --.  
Column 8, line 25, claim 9, a -- , -- should be inserted after -- membrane --.

Signed and Sealed this  
Tenth Day of February, 2015

Michelle K. Lee  
*Deputy Director of the United States Patent and Trademark Office*